United States Patent [19]

Inoguchi et al.

[11] Patent Number: 4,845,061
[45] Date of Patent: Jul. 4, 1989

[54] SILICON NITRIDE-ALUMINA COMPOSITE CERAMICS AND PRODUCING METHOD THEREOF

[75] Inventors: Kazuhiro Inoguchi; Novuei Ito, both of Okazaki; Naochika Nunogaki, Kariya; Tetsuo Toyama, Anjo, all of Japan

[73] Assignee: Nippon Soken, Inc., Nishio, Japan

[21] Appl. No.: 13,583

[22] Filed: Feb. 11, 1987

[30] Foreign Application Priority Data

Feb. 12, 1986 [JP] Japan .................................. 61-28461

[51] Int. Cl.$^4$ ............................................. C04B 35/58
[52] U.S. Cl. ........................................ 501/97; 501/98
[58] Field of Search ................................... 501/96–98; 264/65, 66

[56] References Cited

U.S. PATENT DOCUMENTS

| | | | |
|---|---|---|---|
| 3,903,230 | 9/1975 | Kamigaito et al. | 264/122 |
| 3,953,221 | 4/1976 | Lange | 501/98 |
| 4,357,526 | 11/1982 | Yamamoto et al. | 219/541 |
| 4,475,029 | 10/1984 | Yoshida et al. | 219/270 |
| 4,486,651 | 12/1984 | Atsumi et al. | 219/553 |
| 4,499,366 | 2/1985 | Yoshida et al. | 219/270 |
| 4,556,780 | 12/1985 | Atsumi et al. | 219/270 |
| 4,598,676 | 7/1986 | Ito et al. | 123/145 A |
| 4,613,455 | 9/1986 | Suzuki et al. | 252/516 |
| 4,633,064 | 12/1986 | Atsumi et al. | 219/270 |
| 4,634,837 | 1/1987 | Ito et al. | 219/270 |
| 4,644,133 | 2/1987 | Atsumi et al. | 219/270 |

FOREIGN PATENT DOCUMENTS

| | | | |
|---|---|---|---|
| 55-121956 | 9/1980 | Japan | 501/96 |
| 60-16870 | 1/1985 | Japan | 501/98 |

OTHER PUBLICATIONS

Hoch et al, "Preparation and Characterization of Ultrafine Powders of Refractory Nitrides:", Sialon; Ceramic Bulletin; vol. 58, No. 2 (1979).
75/2543 Special Ceramics; Lange; "Fabrication & Properties of Silicon Compounds".

Primary Examiner—Jacqueline V. Howard
Assistant Examiner—Ann Knab
Attorney, Agent, or Firm—Cushman, Darby & Cushman

[57] ABSTRACT

Silicon nitride-alumina composite ceramics composed of silicon nitride crystals, α-alumina crystals and β'-sialon crystals, wherein the silicon nitride crystals and the β'-sialon surrounded the α-alumina crystals so as to prevent the connection of the α-alumina crystals. And a method for producing the silicon nitride-alumina composite ceramics which has the steps of preparing a mixture powder composed of 20 to 70 wt % of alumina powder and silicon nitride powder as a remainder, the average particle diameter of the alumina powder being two or more times as large as that of the silicon nitride powder, and firing the mixture powder in an atmosphere of inactive gas.

4 Claims, 4 Drawing Sheets

F I G.1
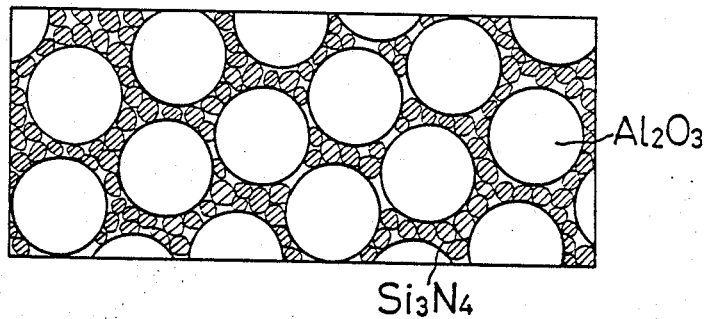
F I G.2
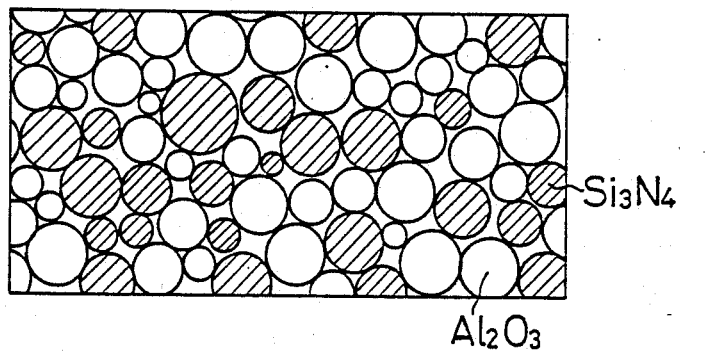

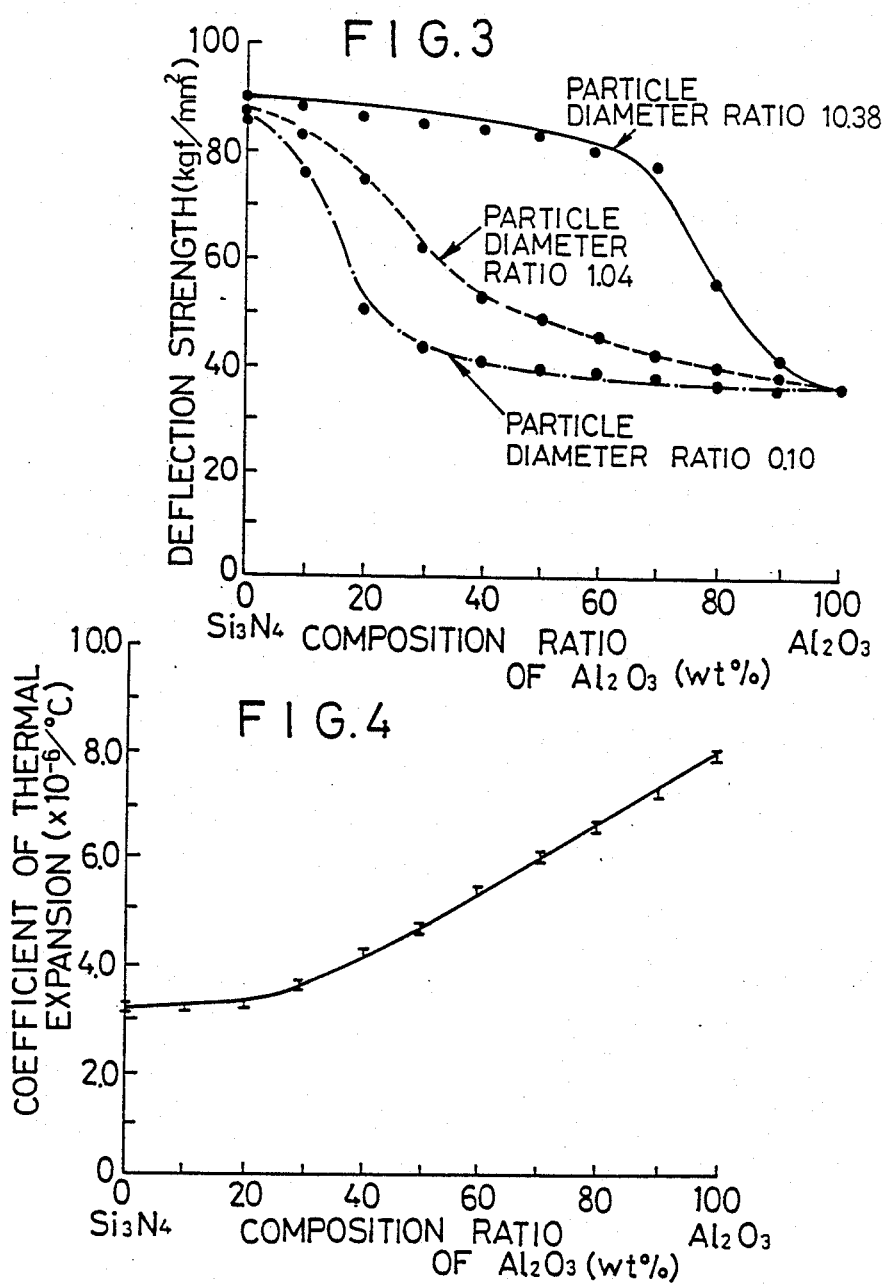

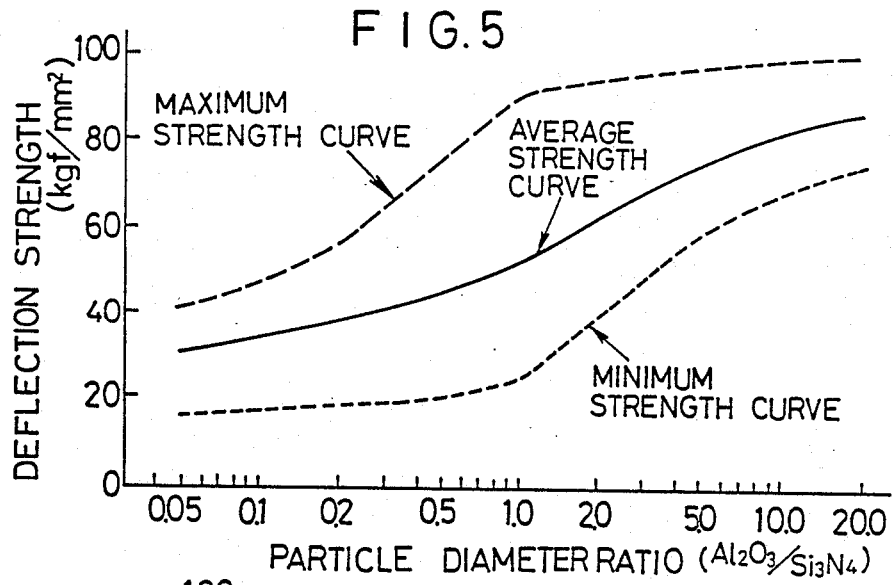
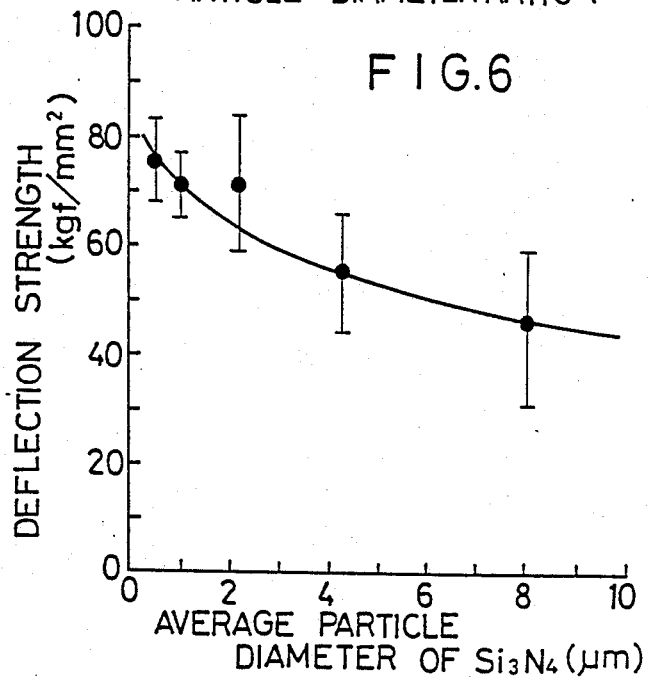

SILICON NITRIDE-ALUMINA COMPOSITE CERAMICS AND PRODUCING METHOD THEREOF

BACKGROUND OF THE INVENTION

1. Field of the Invention

The present invention relates to silicon nitride-alumina composite ceramics suitable to the material for a heater supporting member of a ceramic glow plug, a base plate of an IC pressure sensor and the like.

2. Description of the Prior Art $\beta'$-sialon[$Si_{6-z}Al_zO_zN_{8-z}(Z=0$ to $4.2)$] is well known as the silicon nitride-alumina ceramics.

$\beta'$-sialon is a complete solid solution of silicon nitride and $\alpha$-alumina, of which the coefficient of thermal expansion is as small as $3.0 \times 10^{-6}/°C$. in the temperature range from room temperature to 1000° C., similar to that of silicon nitride.

The material having a small coefficient of thermal expansion generally exhibits excellent thermal shock resistance, but the use thereof is limited since damage often occurs due to the difference in coefficient of thermal expansion when such material is jointed to another material such as metal.

By preparing a mixture powder of silicon nitride and alumina in an adjusted ratio and sintering the mixture powder under adjusted conditions, not complete solid solution but composite ceramics containing unreacted silicon nitride and $\alpha$-alumina can be obtained. By adjusting the amount of the unreacted alumina, the coefficient of thermal expansion of the obtained ceramics can be adjusted.

However, the experimental results on many samples of ceramics containing unreacted $\alpha$-alumina show that the strength thereof is scattered and some one exhibits rather low strength. This scattering of strength is not observed in the material containing only one of silicon nitride and $\beta'$-sialon.

SUMMARY OF THE INVENTION

It is an object of the present invention to provide ceramics composed of silicon nitride which imparts high strength to ceramics, $\alpha$-alumina which adjusts the coefficient of thermal expansion of ceramics and $\beta'$-sialon which strongly bonds silicon nitride to $\alpha$-alumina, and exhibiting scattering properties, and the producing method thereof.

After many studies and experiments, the present inventors have found that the scattering in strength of silicon nitride-alumina composite ceramics results from the crystal structure of $\alpha$-alumina.

Namely, when the silicon nitride($Si_3N_4$) powder is mixed with alumina($Al_2O_3$) powder as shown in FIG. 2 and is sintered, reaction of forming $\beta'$-sialon in the interfaces between silica nitride particles and alumina particles is produced. However, the interfaces between silicon nitride particles and unreacted alumina particles are not completely buried with $\beta'$-sialon but alumina particles (of which the strength is lower than that of silicon nitride) are connected to one another without intervention of silicon nitride particles. This results in cracks being produced in these connected portions of alumina particles and accordingly, the decrease in strength of obtained ceramics being observed.

According to the present invention, silicon nitride-alumina composite ceramics has a crystal phase mainly composed of silicon nitride, $\alpha$-alumina and $\beta'$-sialon produced by the reaction of silicon nitride and $\alpha$-alumina, wherein $\alpha$-alumina crystals are surrounded by silicon nitride and $\beta'$-sialon crystals so as not to be connected one another.

In this case, silicon-alumina composite ceramics of which the total amount of silicon nitride and $\beta'$-sialon crystals is 45 to 90 wt % and the amount of alumina crystals is 10 to 55 wt %, exhibits high strength substantially equal to that of silicon nitride. And in accordance with the amount of alumina crystals, the coefficient of thermal expansion can be varied in the range from about 3.2 to $6.1 \times 10^{-6}/°C$.

The ceramics having the above properties, is obtained by preparing a mixture power composed of 20 to 70 wt % of alumina powder and silicon nitride powder as the remainder, the average particle diameter of alumina powder being about two or more times as large as that of silicon nitride powder (FIG. 1) and firing the prepared mixture powder in an atmosphere of inactive gas.

When the amount of the alumina powder in the mixture powder is smaller than 20 wt %, almost all alumina powder reacts on silicon nitride powder to be changed into $\beta'$-sialon. This respectively alumina crystals remaining, and accordingly, the adjustment of coefficient of thermal expansion becoming impossible.

When the amount of alumina powder is in the range of 20 wt % to 70 wt %, the alumina powder having the average particle diameter of about two or more times as large as that of silicon nitride must be used in order to surround $\alpha$-alumina crystals by silicon nitride and $\beta'$-sialon crystals.

When the amount of alumina powder is larger than 70 wt %, even if the particle diameter of alumina powder and silicon nitride powder is adjusted, $\alpha$-alumina crystals cannot be surrounded by silicon nitride and $\beta'$-sialon crystals.

The ceramics according to the present invention, the alumina crystals of which the strength is low, are not connected to one another, but surrounded by silicon nitride and $\beta'$-sialon crystals. Therefore, in the ceramics according to the present invention, cracks are scarcely observed as compared with the conventional ceramics of this type. The mixture powder used in the method according to the present invention, has the state that silicon nitride particles of small particle diameter intervene between alumina particles of larger particle diameter so as to surround alumina particles as shown in FIG. 1.

By firing this mixture powder, $\alpha$-alumina crystals become surrounded by silicon nitride and $\beta'$-sialon crystals.

It was confirmed by experiments that the strength of ceramics is scarcely decreased in spite of the increase in amount of alumina crystals in the range of 10 to 55 wt %.

BRIEF EXPLANATION OF THE DRAWINGS

FIG. 1 is a diagram showing the mixing state of a low material of silicon nitride-alumina composite ceramics according to the present invention.

FIG. 2 is a diagram showing the mixing state of the conventional law material;

FIGS. 3, 4, 5, and 6 show the experimental result on the present invention, respectively;

FIG. 6 is a sectional view of a glow plug provided with a ceramic heater wherein silicon nitride-alumina composite ceramics according to the present invention is applied to a heater supporting member.

DETAILED DESCRIPTION OF THE PRESENT INVENTION

Figure 7:
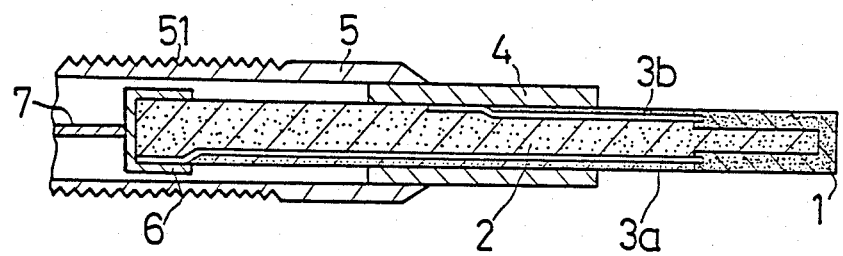

Hereinafter, several experimental results on the strength of ceramics will be explained.

EXPERIMENT 1

Hereafter, silicon nitride powder denotes a mixture powder of 90.0 wt % of silicon nitride($Si_3N_4$)powder, 5.0 wt % of spinel($MgAl_2O_4$)powder and 5.0 wt % of yttria($Y_2O_3$) powder. The spinel powder has an average particle diameter of 1.6 $\mu$m, the yttria powder has an average particle diameter of 1.2 $\mu$m. The spinel and yttria act as sintering auxiliary agent. One of spinel and yttria can be also used.

The average particle diameter of silicon nitride powder denotes that of silicon nitride within the above described mixture powder.

The strength denotes the simply averaged value of the three point bending deflection strength of 20 samples at a normal temperature. Each sample has a polished surface and has a plate shape of 3.0×4.0×40.0 mm. In this experiment, the crosshead speed is 0.5 mm/min, the span is 30.00 mm.

The coefficient of thermal expansion denotes the average value of three samples measured in the temperature range of room temperature to 1000° C. In this case, the increasing rate of temperature is 5° C./min.

Silicon nitride powder and $\alpha$-alumina (hereafter will be called only alumina) powder, each having variously different average particle diameters are mixed with each other together with an organic solvent, and the mixture powder is formed by the doctor blade method to obtain a plurality of ceramic sheets. The obtained ceramic sheets are piled on one another and laminated at about 120° C. Then, the laminated body is held in an atmosphere of inactive gas such as argon(Ar) an nitrogen($N_2$)gas at 1600° C. for 30 to 60 minutes, and hot-pressed under a pressure of 500 kgf./$cm^2$ to obtain a silicon nitride-alumina composite ceramics.

The properties of the obtained ceramics are examined.

Table 1 shows the examined properties. FIG. 3 shows the relation between the composition ratio of silicon nitride powder and alumina powder and the deflection strength based on the result of Table 1, and FIG. 4 shows the relation between the above composition ratio and the coefficient of thermal expansion.

In Table 1, the particle diameter ratio denotes the following ratio:

$$\text{Particle Diameter Ratio} = \frac{\text{Average Particle Diameter of Alumina}}{\text{Average Particle Diameter of Silicon Nitride}}$$

Table 1 and FIG. 4 clearly show that the coefficient of thermal expansion is substantially equal in the same composition range of silicon nitride and alumina regardless of the particle diameter of the law material.

In contrast, the deflection strength is considerably influenced by the particle diameter of the law material as is apparent from Table 1 and FIG. 3.

For example, when the average particle diameter of silicon nitride particles is about ten times as large as that of the alumina particles, namely when the particle diameter ratio is 0.10, the strength of the obtained ceramics is decreased to that substantially equal to that of alumina in the case that the composition ratio of the alumina particles is about 20 wt % or more. In contrast, when the average particle diameter of alumina particles is about 10 times as large as that of silicon nitride particles, namely when the particle diameter ratio is 10.38, the strength of the obtained ceramics is nearly equal to that of silicon nitride even in the case that the composition ratio of alumina particles is 70 wt %. However, the relation between the strength and the particle diameter of the law material is not a linear one. When the average particle diameter of silicon nitride particles is nearly equal to that of alumina particles, namely, when the particle diameter ratio is 1.04, the obtained strength is not a middle value thereof but is shifted to the side of alumina particles of lower strength. Namely, in the mixing state shown in FIG. 2, the silicon nitride particles do not react on the alumina particles. The alumina particles having low strength are partially connected. This results in the average strength of the obtained ceramic being shifted to the side of alumina particles as shown in FIG. 3.

In contrast, when the particle size of the silicon nitride particles having high strength is made smaller than that of the alumina particles having low strength, the alumina particles are prevented from being connected to one another in the mixing state shown in FIG. 1. This results in high strength being obtained as shown in FIG. 3.

When the composition ratio of the alumina particles is small, the decrease in strength is not observed and the coefficient of thermal expansion is a small value nearly equal ot that of silicon nitride. This results from the alumina particles reacting on the silicon nitride particles to be changed into $\beta'$-sialon and accordingly no unreacted alumina particles remaining.

As is known from Table 1 and FIG. 3, the ceramics composed of 80 to 30 wt % of silicon nitride and 70 to 20 wt % of alumina of which the particle diameter is increased to have a particle diameter ratio of 10.38, always exhibits high strength over the wide composition range of alumina.

It was confirmed that the ceramics having the particle diameter ratio of 10.38 is composed of silicon nitride crystals, $\alpha$-alumina crystals and $\beta'$-sialon crystals formed by the reaction therebetween, and that $\alpha$-alumina crystals are disconnected and surrounded by the silicon nitride and $\beta'$-sialon crystals.

Furthermore, it was also confirmed that the coefficient of thermal expansion of this ceramics can be varied in the range of 3.2 to 6.1×$10^{-6}$/°C. by setting the amount of silicon nitride crystals and $\beta'$-sialon crystals to 45 to 90 wt % and setting the amount of $\alpha$-alumina crystals to 10 to 55 wt %.

EXPERIMENT 2

50 wt % of silicon nitride powder and 50 wt % of alumina powder, of which the average particle diameter is variously changed from each other, are mixed and formed into silicon nitride-alumina composite ceramics having variously different particle diameter ratios in similar method to Experiment 1. And the properties of the obtained ceramics are examined. The result of the examination is shown in Table 2 and FIG. 5.

As is apparent from FIG. 5, the strength of the ceramics is increased as the increase in particle diameter ratio. In FIG. 5, an average strength of 100 samples, which is obtained by using Weibull probability paper, is shown. When the particle diameter ratio is logarithmically indicated, the average strength is almost linearly increased in proportion to the particle diameter ratio.

The maximum strength and the minimum strength are changed along an S curve, respectively, each having an inflection point at the particle diameter ratio of about 1.0. Especially, the minimum strength is inreased over the particle diameter ratio of about 1.0 and remarkably increased over the particle diameter ratio of 2.0.

From FIG. 5, it can be concluded that the preferable particle diameter ratio is 2.0 or more and more preferable ratio is 4.0 or more. Samples Nos. 6 to 9 in Table 2 have the above described preferable particle diameter ratio.

The coefficient of thermal expansion of three samples randomly selected from each of samples Nos. 1 to 9 (total number of the measured samples is 27) which is measured in the temperature range of room temperature to 1000° C., is within the range of $4.75 \pm 0.1 \times 10^{-6}/°C$.

EXPERIMENT 3

50.0 wt % of silicon nitride powder and 50.0% of alumina powder are mixed by changing the average particle diameter of silicon nitride powder and alumina powder so as to have a particle diameter ratio of 4.2 to 4.6. The obtained mixture powder is sintered by the method similar to that of Experiment 1. And the properties of the obtained silicon nitride-alumina composite ceramics are examined. The result of the experiment was shown in Table 3 and FIG. 6.

As is apparent from FIG. 6, when the average particle diameter of the silicon nitride particles and alumina particles of the ceramics having the same particle diameter ratio, are increased, the strength thereof is decreased and scattered in an enlarged range.

This seems to result from the preferable mixing state as shown in FIG. 1 being not obtained when the particle diameter of silicon nitride particles and alumina particles is excessively increased.

Namely, it is considered that many portions of the surface of alumina particles do not come in contact with the silicon nitride particles and alumina particles are not surrounded by $\beta'$-sialon phase, and accordingly, cracks are generated in the alumina particles. Under the above circumstances, it is preferable to use alumina particles having an average particle size of about $10\mu m$ or less.

In addition, other experimental results on the particle diameter show that the preferable average particle size of silicon nitride is about $2\mu m$ or less.

The average strength is obtained by simply averaging the strength of ten samples.

EXPERIMENT 4

Hereinafter, the results of endurance tests on the silicon nitride-alumina composite ceramics applied to a glow plug for a diesel engine will be explained.

In the glow plug shown in FIG. 7, a heater element 1 having a letter U shaped section is jointed to a tip end of a rod-shaped heater supporting member 2. A pair of lead wires 3a and 3b made of tungsten are embedded in the supporting member 2 in its axial direction. An end of each of the lead wires 3a and 3b is connected to the heater element 1. A metallic sleeve 4 is installed around the supporting member 2 and a metallic body 5 is installed around the metallic sleeve 4.

Another end of the lead wire 3a extends to a base end of the supporting member 2 and is connected to a metallic cap 6 fit on the base end of the supporting member 2 to be electrically connected to an electric power source (not shown) through a cap 6 and a nickel wire 7.

Another end of the lead wire 3b is electrically connected to the metallic body 5 through the metallic sleeve 4.

The glow plug having the above described structure is secured in a wall defining a combustion chamber of an engine(not shown) by a screw 51 formed in the metallic body 5 so as to penetrate the wall.

The heater element 1 is composed of a sintered body made of a mixture powder of conductive molybdenum disilicide ($MoSi_2$) and insulating silicon nitride. $MoSi_2$ imparts oxidization resistance to the heater element 1 and $Si_3N_4$ imparts thermal shock resistance thereto.

The supporting member 2 is composed of silicon nitride-alumina composite ceramics made of a sintered body of a mixture powder of silicon nitride and alumina. The supporting member 2 is integrally sintered with the heater element 1.

Figure 8:
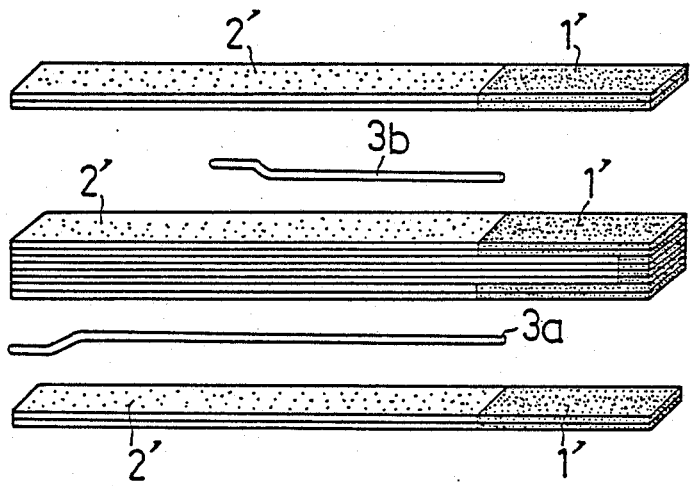
FIG. 8 is a view showing the producing method of the ceramic heater.

FIG. 8 shows the producing method of a ceramic heater.

Ceramic sheets 1' for forming the heater element 1 and ceramic sheets 2' for forming the supporting member 2 are assembled and piled on one another as shown in FIG. 8. And the lead wires 3a and 3b are sandwiched between the ceramic sheets 1' and 2' and then the obtained body is hot-pressed at 1600° C. under 500 kg/cm² thereby to obtain a ceramic heater.

In operation, an electric current flows to the heater element 1 through the nickel wire 7, the metallic cap 6 and the lead wire 3a to generate heat, and is grounded through the lead wire 3b, the metallic sleeve 4 and the metallic body 5.

Next, ceramic heaters, each of which has the supporting member 2 made of silicon nitride-alumina composite ceramics formed by methods equal to those of Samples Nos. 3, 5 and 7 of Experiment 2, are prepared and are installed in glow plugs. Then, endurance tests are conducted on these glow plugs. In this case, each heater element is made of 71.7 wt % of molybdenum disilicate and 28.3 wt % of silicon nitride. And the resistance of this heater element is 0.18Ω at a normal temperature.

The endurance tests are conducted by the following method: Voltage is set so that the equilibrium temperature is 1300° C. This set voltage is intermittently applied to each glow plug in the cycle of one minute voltage application and one minute voltage nonapplication. And the number of cycles when cracks are observed in each supporting member 2, is examined.

In the glow plugs, each having the supporting member made of Sample 3 in Experiment 2, all of four supporting members being to be cracked in the vicinity of the heater element in under 3000 cycles.

In the glow plugs, each having the supporting member made of Sample 5, three out of four supporting members are similarly cracked in 3000 to 4000 cycles and the remaining one supporting member is similarly cracked in 6000 to 7000 cycles.

However, in the glow plugs, each having the supporting member made of Sample 7, all of four supporting members are not cracked even in 10,000 cycles.

Considering the above test results, the supporting member made of a sintering body of a mixture of silicon nitride and alumina has been given attention in order to properly adjust the coefficient of thermal expansion. However, silicon nitride and alumina react to form $\beta'$-sialon. This $\beta'$-sialon exhibits high strength similar to that of silicon nitride but the coefficient of thermal expansion thereof is low similar to that of silicon nitride.

Under the above circumstances, the composition ratio of alumina within the mixture powder has been gradually increased in order to make a part of alumina crystals within the sintering body unreacted and adjusts the coefficient of thermal expansion by the unreacted alumina crystals. This results in the strength of the ceramics being widely scattered and accordingly, there sometimes occurs such a problem as the production of supporting members of low strength.

According to the present invention, the above described heater element can be supported by the heater supporting member having a coefficient of thermal expansion similar to that of the heater element, heat resistance and unscattered strength. In the supporting member for a heater element for a glow plug, it is preferable to use such alumina powder as having an average particle diameter of about four times as large as that of silicon nitride.

The heater element for a ceramic glow plug is desired to have excellent oxidization resistance, small specific resistance and a large coefficient of thermal expansion. A sintered body of a mixture of molybdenum disilicide and silicon nitride is well known as the material of the heater element having the above described properties.

The most preferably composition ratio of the above mixture is 71.1 wt % of molybdenum disilicide and 28.3 wt % of silicon nitride as described above. The coefficient of thermal expansion of the heater element having the above composition ratio is about 4.4 to $5.2 \times 10^{-6}/°C$. in the temperature range of room temperature to 1000° C.

The supporting member formed according to the present invention, which supports the heater element of the ceramic glow plug must have insulating properties a, coefficient of thermal expansion similar to that of the heater element, heat resistance and strength durability for use within an engine.

The supporting member made of silicon nitride has properties similar to the above described conditions, but the coefficient of thermal expansion of silicon nitride is as small as about $3.0 \times 10^{-6}/°C$. in the temperature range of room temperature to 1000° C. This results in the supporting member made of silicon nitride being damaged in joint portions with the heater element due to the difference in coefficient of thermal expansion.

As described above, according to the present invention, silicon nitride-alumina composite ceramics having excellent strength, unscattered properties and variously different coefficients of thermal expansion can be obtained.

Therefore, the ceramics according to the present invention can be suitably used in a heater supporting member of a ceramic glow plug, a base plate of an IC pressure sensor and the like.

TABLE 1

| | | Average Particle Diameter [μm] | | | |
|---|---|---|---|---|---|
| $Si_3N_4$ | $Al_2O_3$ | $Si_3N_4$ | $Al_2O_3$ | $Si_3N_4$ | $Al_2O_3$ |
| 2.22 | 0.23 | 0.49 | 0.51 | 0.21 | 2.18 |
| | | Particle Diameter Ratio [—] | | | |
| | 0.10 | | 1.04 | | 10.38 |
| | | Composition Ratio [wt %] | | | |
| $Si_3N_4$ | $Al_2O_3$ | Strength [kgf./mm²] | Coefficient of Thermal Expansion [× $10^{-6}/°C$.] | Strength [kgf./mm²] | Coefficient of Thermal Expansion [× $10^{-6}/°C$.] | Strength [kgf./mm²] | Coefficient of Thermal Expansion [× $10^{-6}/°C$.] |
| 100 | 0 | 87.4 | 3.20 | 88.6 | 3.18 | 90.1 | 3.18 |
| 90 | 10 | 76.1 | 3.20 | 83.8 | 3.19 | 88.8 | 3.21 |
| 80 | 20 | 50.6 | 3.21 | 74.8 | 3.24 | 86.7 | 3.28 |
| 70 | 30 | 43.3 | 3.58 | 62.4 | 3.66 | 85.2 | 3.65 |
| 60 | 40 | 40.5 | 4.18 | 53.0 | 4.22 | 84.8 | 4.24 |
| 50 | 50 | 39.2 | 4.65 | 48.8 | 4.76 | 83.9 | 4.78 |
| 40 | 60 | 38.5 | 5.38 | 45.6 | 5.47 | 80.4 | 5.52 |
| 30 | 70 | 37.8 | 6.12 | 42.2 | 6.08 | 77.5 | 6.11 |
| 20 | 80 | 36.6 | 6.78 | 39.9 | 6.67 | 55.4 | 6.72 |
| 10 | 90 | 36.2 | 7.30 | 37.7 | 7.28 | 40.6 | 7.22 |
| 0 | 100 | 35.7 | 7.86 | 36.4 | 7.80 | 35.4 | 8.06 |

TABLE 2

| | Sample No. | | | | | | | | |
|---|---|---|---|---|---|---|---|---|---|
| | 1 | 2 | 3 | 4 | 5 | 6 | 7 | 8 | 9 |
| $Si_3N_4$ Average Particle Diameter[μm] | 4.26 | 2.22 | 1.02 | 1.02 | 0.49 | 0.49 | 0.21 | 0.21 | 0.21 |
| $Al_2O_3$ Average Particle Diameter[μm] | 0.23 | 0.23 | 0.23 | 0.51 | 0.51 | 1.07 | 1.07 | 2.18 | 4.33 |
| Particle Diameter Ratio($Al_2O_3/Si_3N_4$)[—] | 0.05 | 0.10 | 0.22 | 0.50 | 1.04 | 2.18 | 5.10 | 10.38 | 20.62 |
| 50% Average Strength [kgf./mm²] | 31.2 | 34.6 | 39.5 | 44.0 | 53.0 | 63.7 | 76.1 | 82.6 | 87.0 |
| Maximum Strength [kgf./mm²] | 41.8 | 48.3 | 56.9 | 77.2 | 92.6 | 96.5 | 98.2 | 100.6 | 10.25 |
| Minimum Strength [kgf./mm²] | 16.5 | 17.0 | 19.3 | 21.0 | 25.4 | 40.2 | 60.3 | 68.8 | 74.7 |
| Weibull Coefficient | 16.2 | 14.1 | 9.8 | 5.9 | 4.1 | 6.4 | 10.1 | 13.9 | 15.7 |

TABLE 3

| Sample No. | 1 | 2 | 3 | 4 | 5 |
|---|---|---|---|---|---|
| $Si_3N_4$ Average Particle Diameter [μm] | 0.49 | 1.02 | 2.22 | 4.26 | 8.05 |
| $Al_2O_3$ Average Particle Diameter [μm] | 2.18 | 4.33 | 10.06 | 18.32 | 35.74 |
| Particle Diameter Ratio $(Al_2O_3/Si_3N_4)$ [-] | 4.45 | 4.25 | 4.53 | 4.30 | 4.44 |
| Average Strength [kgf./mm$^2$] | 75.4 | 70.8 | 71.2 | 55.3 | 46.7 |
| Maximum Strength [kgf./mm$^2$] | 83.3 | 77.0 | 84.1 | 65.9 | 59.5 |
| Minimum Strength [kgf./mm$^2$] | 68.2 | 65.1 | 59.2 | 44.2 | 30.8 |

What is claimed is:

1. Silicon nitride-alumina composite ceramics composed of a sintered body of a mixture of alumina particles and silicon nitride particles, the average particle diameter of said alumina particles being two or more times as large as that of said silicon nitride particles, said ceramics including silicon nitride crystals, α-alumina crystals and β'-sialon crystals, the total amount of said silicon nitride crystals and said β'-sialon crystals being 45 to 90 wt %, and the amount of said α-alumina crystals being 10 to 55 wt %, said silicon nitride crystals and said 'sialon crystals surrounding said α-alumina crystals so as to prevent the connection of said α-alumina crystals.

2. A heater supporting member for a ceramic glow plug, composed of a sintered body of a mixture of alumina particles and silicon nitride particles, the average particle diameter of said alumina particles being two or more times as large as that of said silicon nitride particles, and said sintered body having a structure wherein silicon nitride crystals and β'-sialon crystals surround α-alumina crystals so as to prevent the connection of said α-alumina crystals.

3. Silicon nitride-alumina composite ceramics according to claim 1, wherein said mixture being composed of 20 to 70 wt % of alumina particles and silicon nitride particles as a remainder and the average particle diameter of said silicon nitride particles is 2μm or less.

4. A heater supporting member according to claim 2, wherein said mixture being composed of 20 to 70 wt % of alumina particles and silicon nitride particles as a remainder and the average particle diameter of said silicon nitride particles is 2μm or less.

* * * * *